J. B. CARSON.
Cotton-Chopper.
No. 224,645.   Patented Feb. 17, 1880.
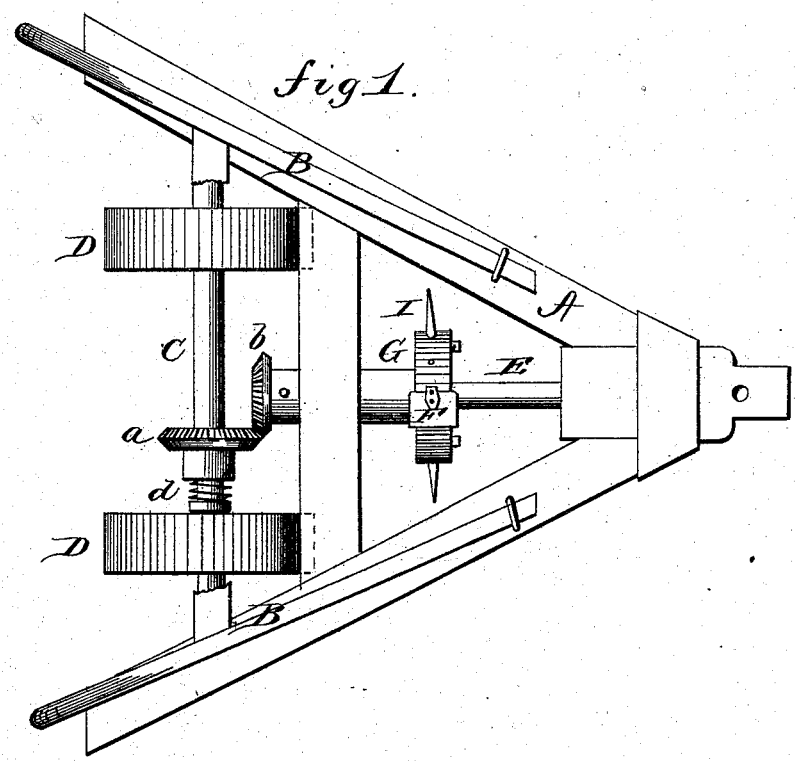
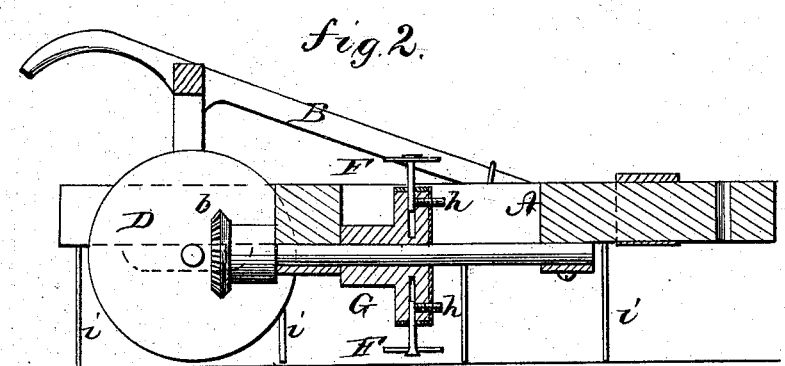
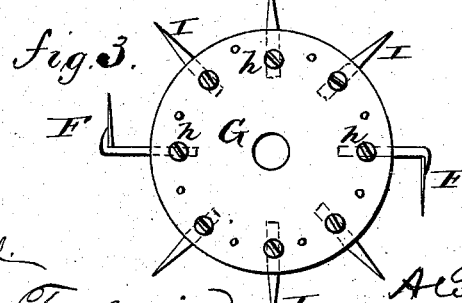
WITNESSES  
INVENTOR  
ATTORNEYS

UNITED STATES PATENT OFFICE.

JAMES B. CARSON, OF GRIFFIN, GEORGIA.

COTTON-CHOPPER.

SPECIFICATION forming part of Letters Patent No. 224,645, dated February 17, 1880.

Application filed November 25, 1879.

*To all whom it may concern:*

Be it known that I, JAMES B. CARSON, of Griffin, in the county of Spalding, and in the State of Georgia, have invented certain new and useful Improvements in Cotton-Choppers; and I do hereby declare that the following is a full, clear, and exact description thereof, reference being had to the accompanying drawings, and to the letters of reference marked thereon, making a part of this specification.

The nature of my invention consists in the construction and arrangement of a combined cotton-chopper, harrow, and cultivator, as will be hereinafter more fully set forth.

In the annexed drawings, Figure 1 is a plan view of my machine. Fig. 2 is a longitudinal section of the same. Fig. 3 shows the chopping-wheel.

A represents the frame, made in V shape, and provided with suitable handles B B. In the rear portion of the frame is an axle or shaft, C, on which are secured two wheels, D D. The shaft C also carries a bevel-gear wheel, $a$, which meshes with a similar wheel, $b$, on the rear end of a shaft, E, that runs forward, as shown, and carries the chopping-wheel. The gear-wheel $a$ is feathered on the shaft C, and held by a spring, $d$, in gear with the wheel $b$, which allows said wheel $a$ to give or move out of gear when the hoes strike any rock, stump, or other obstruction.

G is the chopping-wheel, formed with a series of radial holes, in which are inserted teeth I and hoes F, the said teeth and hoes being adjustable out and in, and fastened by means of set-screws $h$. $i$ $i$ are the teeth, fastened in the frame A.

The two front teeth of the harrow straddle the cotton-bed. When the ground is baked so that the seed cannot come up, the front teeth, $i$, cultivate the sides of the row, while the other teeth, I, cultivate the bed or row itself. The cultivator runs immediately over the seed crosswise and loosens the earth, so that the seed can come up.

The hoes F are used in chopping out the cotton, and are adjustable to cut more or less.

Having thus fully described my invention, what I claim as new, and desire to secure by Letters Patent, is—

In a combined harrow, cultivator, and cotton-chopper, the combination of the V-shaped frame A, having teeth $i$, axle C, with pinion $a$, shaft E, with pinion $b$, and wheel G, provided with the radially-adjustable teeth I, and hoes F, as and for the purposes herein set forth.

In testimony that I claim the foregoing I have hereunto set my hand this 19th day of November, 1879.

JAMES B. CARSON.

Witnesses:
J. Q. A. ALFORD,
H. B. WHITE.